United States Patent
Cordes et al.

(10) Patent No.: US 9,273,406 B2
(45) Date of Patent: Mar. 1, 2016

(54) ELECTROLYTIC CELL HAVING A LAMINATED CORE OF LAMINATIONS WHICH ARE STACKED ONE ON TOP OF THE OTHER WITH RECESSES, AND METHOD FOR MANUFACTURING AND OPERATING SAME

(75) Inventors: Ralf Cordes, Erlangen (DE); Klaus Dennerlein, Erlangen (DE); Alexander Hahn, Roettenbach (DE); Hagen Hertsch, Erlangen (DE); Norbert Huber, Erlangen (DE); Carola Kuehn, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 14/112,811

(22) PCT Filed: Mar. 27, 2012

(86) PCT No.: PCT/EP2012/055366
§ 371 (c)(1),
(2), (4) Date: Oct. 18, 2013

(87) PCT Pub. No.: WO2012/143211
PCT Pub. Date: Oct. 26, 2012

(65) Prior Publication Data
US 2014/0034511 A1 Feb. 6, 2014

(30) Foreign Application Priority Data
Apr. 20, 2011 (DE) .......................... 10 2011 007 759

(51) Int. Cl.
*C25B 13/02* (2006.01)
*C25B 1/10* (2006.01)
(Continued)

(52) U.S. Cl.
CPC . *C25B 13/02* (2013.01); *C25B 1/10* (2013.01); *C25B 9/066* (2013.01); *C25B 9/20* (2013.01); *C25B 9/203* (2013.01); *Y02E 60/366* (2013.01); *Y10T 29/53204* (2015.01)

(58) Field of Classification Search
CPC ........ C25B 13/02; C25B 9/066; C25B 9/206; C25B 9/20; C25B 9/203; C25B 1/10
USPC ........... 204/255, 257, 263, 269, 275.1, 278.5; 205/628
See application file for complete search history.

(56) References Cited

U.S. PATENT DOCUMENTS 5,366,823 A * 11/1994 Leonida et al. ............... 429/468
6,171,719 B1 1/2001 Roy et al.
(Continued)

FOREIGN PATENT DOCUMENTS

DE 69736864 T2 9/2007
DE 102007029428 A1 1/2008
(Continued)

*Primary Examiner* — Nicholas A Smith
(74) *Attorney, Agent, or Firm* — Laurence Greenberg; Werner Stemer; Ralph Locher

(57) ABSTRACT

An electrolytic cell, a method for manufacturing the cell, and a method of operating same. The electrolytic cell has at least two bipolar plates, at least one fluid inflow and outflow, as well as at least one laminated core arranged between the at least two bipolar plates. The laminated core is constructed from laminations which are stacked one on top of the other. At least two laminations have recesses which are designed to extend through the entire thickness of the respective lamination. The at least two laminations are arranged one on top of the other in such a way that recesses in adjacent laminations overlap partially, but not completely, as a result of which ducts, which are continuous in the direction of the plane of the lamination, are formed.

20 Claims, 2 Drawing Sheets

(51) Int. Cl.
*C25B 9/20* (2006.01)
*C25B 9/06* (2006.01)

(56) References Cited

U.S. PATENT DOCUMENTS

| | | |
|---|---|---|
| 7,528,604 B2 | 5/2009 | Gromoll et al. |
| 8,133,591 B2 | 3/2012 | Zhong et al. |
| 2005/0115825 A1 | 6/2005 | Frank et al. |
| 2010/0062289 A1 | 3/2010 | Christie et al. |
| 2010/0304275 A1* | 12/2010 | Lee et al. .............. 429/515 |
| 2012/0055659 A1 | 3/2012 | Hubert et al. |

FOREIGN PATENT DOCUMENTS

| | | |
|---|---|---|
| DE | 102008018366 A1 | 10/2009 |
| DE | 102006036833 B4 | 12/2012 |
| EP | 1742285 A1 | 1/2007 |
| WO | 9967447 A1 | 12/1999 |

\* cited by examiner

ELECTROLYTIC CELL HAVING A LAMINATED CORE OF LAMINATIONS WHICH ARE STACKED ONE ON TOP OF THE OTHER WITH RECESSES, AND METHOD FOR MANUFACTURING AND OPERATING SAME

Electrolytic cell having a laminated core of laminations which are stacked one on top of the other with recesses, and method for manufacturing and operating same

BACKGROUND OF THE INVENTION

Field of the Invention

The present invention relates to an electrolytic cell comprising at least two bipolar plates, at least one fluid inflow and outflow and at least one laminated core arranged between the at least two bipolar plates, the laminated core being constructed from laminations which are stacked on top of one another and at least two laminations have recesses which are configured to extend through the entire thickness of the respective lamination. The present invention also relates to a method for manufacturing and operating the electrolytic cell.

Electrolytic cells are made of massive parts, for example, titanium plates. The channel systems are introduced into the material by cutting or stamping machining of the massive parts. These channel systems serve for water infeed and gas removal. In order to be able to introduce channels into the massive parts by cutting machining, the parts must have a large thickness in the centimeter range. This results in high material costs and processing costs. Specifically with regard to series production, reduction of the material to be used, the manufacturing effort and the costs is desirable.

BRIEF SUMMARY OF THE INVENTION

It is an object of the present invention to provide an electrolytic cell that is easily manufactured, requires only small amounts of material for production thereof and which therefore saves costs. It is a further object of the present invention to provide a method for manufacturing an electrolytic cell of this type and a method for operating the electrolytic cell.

The specified object is by the electrolytic cell, cell as claimed and by the method for the operation of the electrolytic cell cell as claimed, and the method for the manufacturing of the electrolytic cell, as claimed.

Advantageous embodiments of the inventive electrolytic cell and of the method for operating the electrolytic cell are disclosed in the respectively associated dependent claims. The features of the additional independent claims can be combined with one another and with the features of a respective associated dependent claim or preferably also with the features of a plurality of associated dependent claims.

The electrolytic cell according to the invention comprises at least two bipolar plates, at least two water inflows and outflows and at least one laminated core, arranged between the at least two bipolar plates. The laminated core is constructed from laminations stacked on top of one another, at least two laminations having recesses which are configured to extend through the entire thickness of the respective lamination. The at least two laminations are arranged on top of one another such that recesses of adjacent laminations partially, but not completely, overlap so that in the direction of the plane of the laminations, continuous channels are formed which are in fluidic contact with the fluid inflow and the fluid outflow.

Said laminations can be manufactured easily and economically in a method for manufacturing the electrolytic cell in that the recesses are, for example, stamped out of the laminations. Alternatively, the recesses can be drilled out, milled, etched and/or formed with the aid of a laser. The use of laminations stacked on top of one another with recesses to form channels leads to a saving of material, in contrast to the use of massive parts, into the surface of which the channels are milled, since the laminations can be manufactured very thin with continuous recesses through the respective lamination.

In a preferred embodiment of the inventive electrolytic cell, the channels are fluidically connected to the fluid inflow and outflow. The fluid inflow and outflow can each comprise connections to the electrolytic cell for an inward or outward flow of fluids. Furthermore, the electrolytic cell can comprise electrical terminals, in particular at the bipolar plates and/or laminations. By means of said terminals, an electrical voltage can be applied to the electrolytic cell in order to achieve electrolysis in the interior. The electrolytic cell can also comprise at least one MEA (Membrane Electrode Assembly) which enables a separation of oxygen and hydrogen.

The electrolytic cell can comprise at least two first laminations which are arranged on top of one another such that recesses in the at least two first laminations overlap partially, but not completely. By this means, continuous first channels are formed in the direction of the plane of the laminations. Said channels can be fluidically connected to a first fluid inflow and outflow. By this means, a first half cell of the electrolytic cell can be or is formed. The electrolytic cell can comprise at least two second laminations which are arranged on top of one another such that recesses in the at least two second laminations overlap partially, but not completely. By this means, continuous second channels are formed in the direction of the plane of the laminations. Said second channels can be fluidically connected to a second fluid inflow and outflow. By this means, a second half cell of the electrolytic cell can be or is formed. An MEA can be arranged between the at least two first laminations and the at least two second laminations, by means of which MEA a fluidic contact exists between the first and second channels.

In a method for operating the electrolytic cell, a fluid, in particular water, is fed in via a fluid inflow. Said fluid flows into the channels of the at least two laminations and is conducted away from the electrolytic cell, in particular, via a fluid outflow, from the channels of the at least two laminations.

A fluid, in particular water, can be fed via a first fluid inflow, and flow into the channels of the at least two first laminations and can be conducted away from the channels of the at least two first laminations out of the electrolytic cell, in particular via a first fluid outflow. A fluid, in particular water, can be fed via a second fluid inflow, and can flow into the channels of the at least two second laminations and can be conducted away from the channels of the at least two second laminations out of the electrolytic cell, in particular via a second fluid outflow. If the at least two first laminations and the at least two second laminations are separated from one another by an MEA, then on application of a voltage between the at least two first laminations and the at least two second laminations, an electrolytic conversion of water can be carried out.

The voltage can be applied by means of electrical terminals at the bipolar plates and/or at the laminations. Hydrogen is formed in the channels of the at least two first laminations and can be conducted out of the electrolytic cell via the first fluid outflow. Oxygen is formed in the channels of the at least two second laminations and can be conducted out of the electrolytic cell via the second fluid outflow. Alternatively, depending on the polarity of the voltage applied, hydrogen can be formed in the channels of the at least two second laminations and can be conducted out of the electrolytic cell in particular via the second fluid outflow. In this case, oxygen is formed in the channels of the at least two first laminations and can be conducted out of the electrolytic cell via the first fluid outflow.

The MEA provides for a separation of oxygen and hydrogen in that the bipolar plates and/or laminations act, with a voltage applied thereto, as electrodes. As a result, the conversion of water to oxygen and positively charged hydrogen ions takes place at the anode (positively charged), wherein said hydrogen ions can wander and/or diffuse through the MEA. The conversion of the hydrogen ions to molecular hydrogen takes place at the cathode (negatively charged).

The recesses which form the channels can have a common form, in particular a Y-form. The Y-form can be made up from similar parts each rotated through 120 degrees.

The recesses can result in a regular pattern, which is advantageous in order to form continuous channels from the overlapping recesses. Regular patterns can also be particularly easily generated or manufactured.

The recesses which have the shape of a letter Y and are arranged in adjacent mutually contacting laminations, can be arranged so as to overlap only in the region of the ends of the Y-shape. Each end of a Y-shaped recess in one lamination can be arranged overlapping with one end of a Y-shaped recess of an adjacent lamination.

The laminations can have a thickness in the range from 0.5 mm to 5 mm and the channels can have a width in the range from 2 mm to 10 mm.

The laminations can be made of or comprise a metal, in particular, electrically conductive iron, steel, titanium or copper. By this means, the laminations can simultaneously be used, in addition to forming the channels, as electrodes. The laminations can be in electrical contact with one another via regions of direct physical contact. Alternatively or additionally, the laminations can be in electrical contact with the electrical terminals of the electrolytic cell. A good current flow is thus possible via the laminations and, in conjunction therewith, good conversion during the electrolysis at the surface in the channels of the laminations, i.e. effective electrolysis can occur.

The invention is based, in general, on the concept that a particularly good conversion of material is achieved by means of electrolysis in an electrolytic cell with a laminated core using channels having a large internal surface area, wherein the channels can be configured particularly easily, for example, by stamping out a pattern of recesses from a lamination and overlaying, for example, identical laminations on top of one another, particularly pushed against one another. The fluid which is to be converted (e.g. water) and the fluid which is produced by the conversion (e.g. oxygen and hydrogen) flows through relevant regions of the electrolytic cell with the smallest possible loss of pressure. A large surface area in the channels results in improved electron transfer during the electrolysis at the channel surfaces/electrode surfaces. Specific forms of the recesses lead to particularly favorable flow conditions in the cooling channels with a small space requirement for the channels in the laminations and to a high mechanical stability in the stack of laminations. The result is an even mass flow of fluid, a possibly good cooling effect, a high electrical conductivity, in particular, in the lamination stacking direction (perpendicular to the longitudinal extent of the laminations) and a high level of efficiency in the electrolytic cell.

The inventive method for manufacturing the electrolytic cell and the inventive method for operating the electrolytic cell result in the above-mentioned advantages as described above for the electrolytic cell according to the invention.

Preferred embodiments of the invention with advantageous developments according to the features of the dependent claims will now be described by reference to the following drawings, without being restricted thereby.

DESCRIPTION OF THE INVENTION

Figure 1:
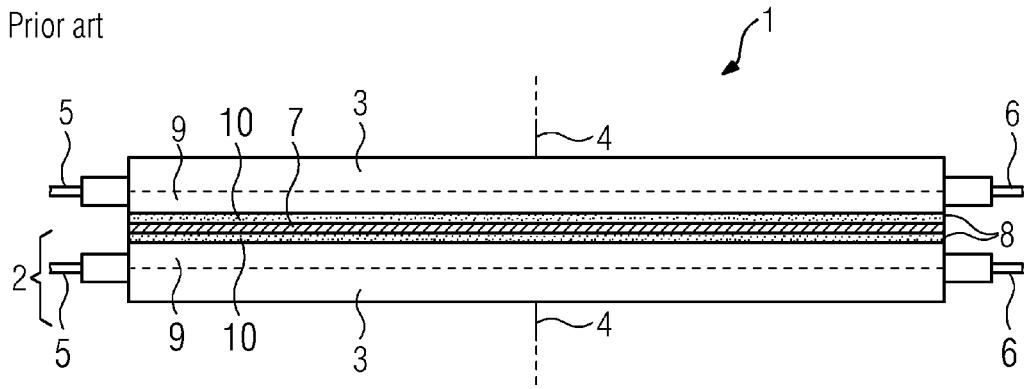
FIG. 1 is a schematic illustration of an electrolytic cell 1 according to the prior art in a lateral section.

FIG. 1 shows the structure, in principle, as a section along a longitudinal axis, of an electrolytic cell 1 according to the prior art. The electrolytic cell 1 comprises two half cells 2 arranged congruently on top of one another, each comprising a bipolar plate 3. Arranged on the bipolar plate 3 is a current terminal or voltage terminal which hereinafter is designated the electrical terminal 4. When the electrolytic cell is used in a stack, said terminals are replaced with adjoining cells. Furthermore, provided at each half cell 2 is a fluid inflow 5 and a fluid outflow 6. Arranged between the two half cells 2 which are arranged on top of one another is an MEA 7, i.e. a membrane electrode assembly. The side 8 of each half cell 2 which is in direct contact with the MEA 7 is provided with channels 9 which are in fluidic contact with the connection for the fluid inflow 5 and the connection for the fluid outflow 6. The side 8 and the channels 9 are covered by a gas diffusion layer 10 which is in direct contact with the MEA 7. Since the two half cells 2 of an electrolytic cell 1 are constructed to be identical and/or mirror images, hereinafter the same reference signs are used for equivalent elements or parts of the two half cells 2.

Figure 2:
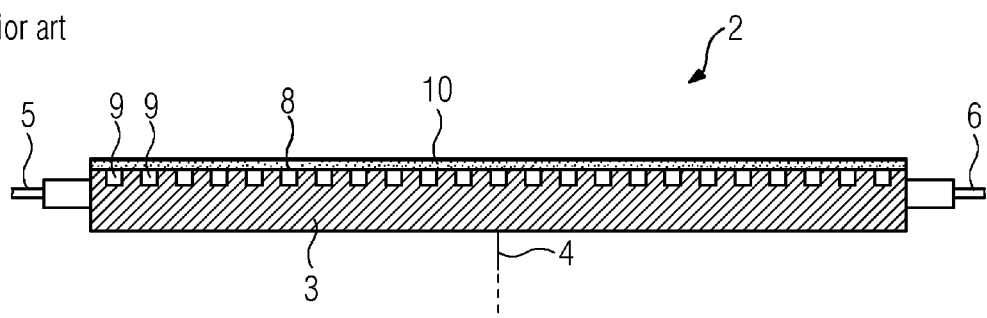
FIG. 2 is a half cell 2 of the electrolytic cell 1 of FIG. 1.

FIG. 2 shows a detailed view of a half cell 2 of the electrolytic cell 1 of FIG. 1, as a section along the longitudinal axis. An electrolytic cell 1 consists of two identically constructed half cells 2. Thus, for the sake of simplicity, only one half cell 2 is shown in detail. The channels 9 are machined into the bipolar plate 3 of the half cell 2 at the surface on one side 8 of the massive plate material, for example, by milling. The plate material consists of a good conductor material, such as copper, titanium, steel or iron. An electrical contact 4 is attached directly to the bipolar plate 3 in order to be able to apply an electric potential to the plate 3 or to be able to pass an electric current via the plate 3.

By means of the connection for the fluid inflow 5 and the connection for the fluid outflow 6, a fluid which flows through the channels 9 can be fed to the half cell 2 and conducted away from the half cell 2. When a positive voltage is applied, the fluid, for example water, is electrolytically converted, that is, oxygen and positively charged hydrogen ions are formed in the channels 9 at the bipolar plate 3. The oxygen can be conducted away via the connection for the fluid outlet 6.

The positively charged hydrogen ions can drift through the gas diffusion layer 10, via the MEA 7 shown in FIG. 1, into the second half cell 2 of the electrolytic cell 1, where with the bipolar plate 3 negatively charged, said ions are converted into molecular hydrogen. The expression drifting is understood to mean diffusion, concentration equalizing movements and/or movements of particles caused by electrical fields. The molecular hydrogen is conducted away via the channels 9 of the second half cell 2 and via the connection for the fluid outlet 6.

The construction of an electrolytic cell 1 from two half cells 2 as shown in FIGS. 1 and 2, each with a massive bipolar plate 3 has the disadvantage that a very large amount of material is required for the bipolar plate 3 and production of the channels 9 in the bipolar plate 3 requires a high degree of effort.

Figure 3:
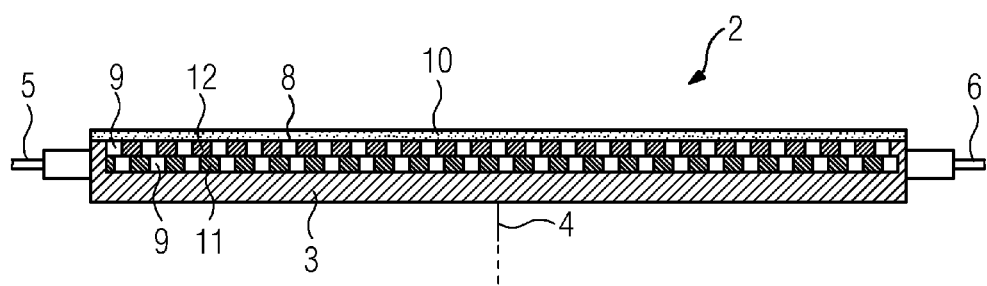
FIG. 3 is a half cell 2 of the inventive electrolytic cell 1 comprising a laminated core 13 which comprises fluid channels 9.

FIG. 3 shows a half cell 2 of an inventive electrolytic cell 1 comprising a laminated core 13 which is constructed from two laminations 11, 12 stacked on top of one another. The half cell 2 is constructed similarly to that shown in FIG. 2 with the exception of the bipolar plate 3. Rather than introducing the channels 9 in the bipolar plate 3 as depressions, for example, by milling, laminations 11, 12 with recesses 14 are arranged on the bipolar plate 3. The recesses 9 in the laminations 11, 12 are pushed against one another so as to form continuous channels in the longitudinal plane of the laminations (perpendicular to the image plane in FIG. 3). On the laminations 11, 12, a gas diffusion layer 10 is arranged on the channels 9, similarly to the example in FIG. 2.

Figure 4:
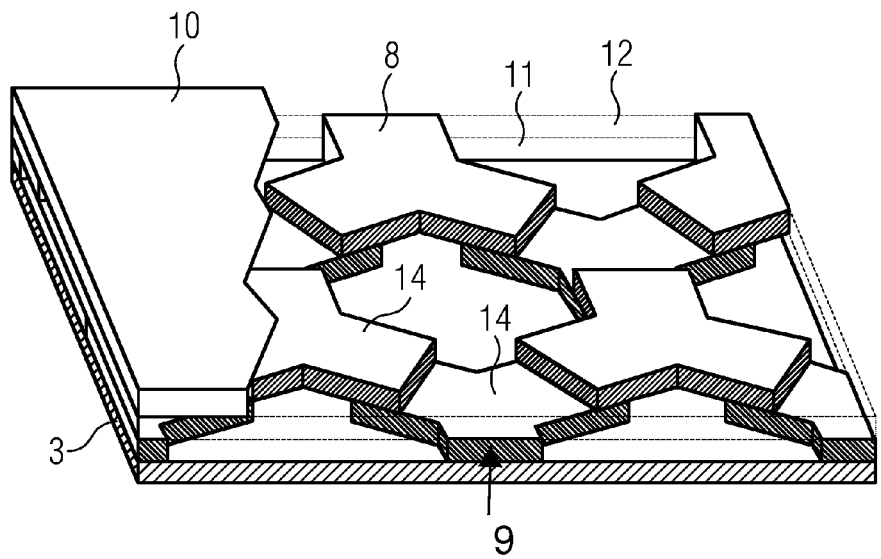
FIG. 4 is the laminated core 13 with channels 9 of FIG. 3 in a perspective view in detail.

FIG. 4 shows the arrangement of the laminations 11, 12 with the recesses 14 illustrated in detail in an oblique view. The Y-shaped recesses 14 of the lamination 12 are arranged on the Y-shaped recesses 14 of the lamination 11 such that the recesses 14 of the adjacent laminations 11, 12 each overlap only at the ends of the Y-shapes and thus form channels 9 along the sheet plane. Shown purely schematically are the gas diffusion layer 10 and the bipolar plate 3.

The recesses 14 in one lamination 11 (without considering the second lamination 12) are arranged at regular separations from one another without touching one another. The second lamination 12 is similarly constructed. Adjacent laminations 11 and 12 are arranged with the recesses 14 thereof such that the recesses of the laminations 11 and 12 overlap only in the edge regions thereof. Each end of a Y-shaped recess of a lamination 11 overlaps one end, in particular exactly one end, of a Y-shaped recess of an adjacent lamination 12 and vice versa. Due to the overlapping recesses 14 of adjacent laminations 11 and 12, continuous fluid channels 9 are formed through the laminations 11, 12. The channels 9 formed by the recesses 14 enable fluid flows with a minimum pressure drop in the channels 9. The fluid flows in the channels 9 both in the plane of the laminations as well as perpendicularly to the plane of the laminations. The result is that particularly good perfusion of the laminations 11, 12 is possible and, despite a compact construction, a large area is formed in the channels 9 for electrolytic conversion.

For the sake of simplicity, the construction of the laminated core 13 from more than 2 laminations 11, 12 is not shown.

Alternative possibilities exist for the stacking of laminations. The laminations in a laminated core can be arranged such that each end of a recess overlaps, in each case, with exactly one end of a recess of an adjacent lamination. All the laminations have the same pattern of recesses and are pushed against one another. An alternative embodiment is the alternating arrangement of laminations. Recesses of only two adjacent laminations overlap and form cooling channels in each case. In each case, a third lamination is arranged with the recesses thereof so as not to overlap with the recesses of the first two laminations, but rather with a further lamination adjacent to said third lamination.

In another embodiment, each laminated core can be formed from a plurality of laminations which have identical recesses and are stacked completely congruently on top of one another. Adjacent laminated cores, each formed from the plurality of congruent laminations are pushed against one another such that the recesses of adjacent lamination stacks overlap only in the edge region thereof. In this way, with laminations of equal thickness having the same patterns of recesses, if required, different channel diameters can be created, depending on the number of laminations in a lamination stack.

The laminations typically have a thickness in the range from 0.5 mm to 5 mm. The channels therefore typically also have a thickness in the range of 0.5 mm to 5 mm (1 mm to 10 mm at points where recesses overlap) in the direction perpendicular to the plane of the laminations. However, the laminations and channels can also have other sizes, for example, in the region of a few centimeters thickness.

The width of the recesses, and therefore of the channels, is preferably in the range from 2 mm to 10 mm. However, channel widths in the region of centimeters are also possible.

In the laminations and/or laminated cores, in place of regular patterns with Y-recesses of the same size, differently shaped recesses can also be formed.

Figure 5:
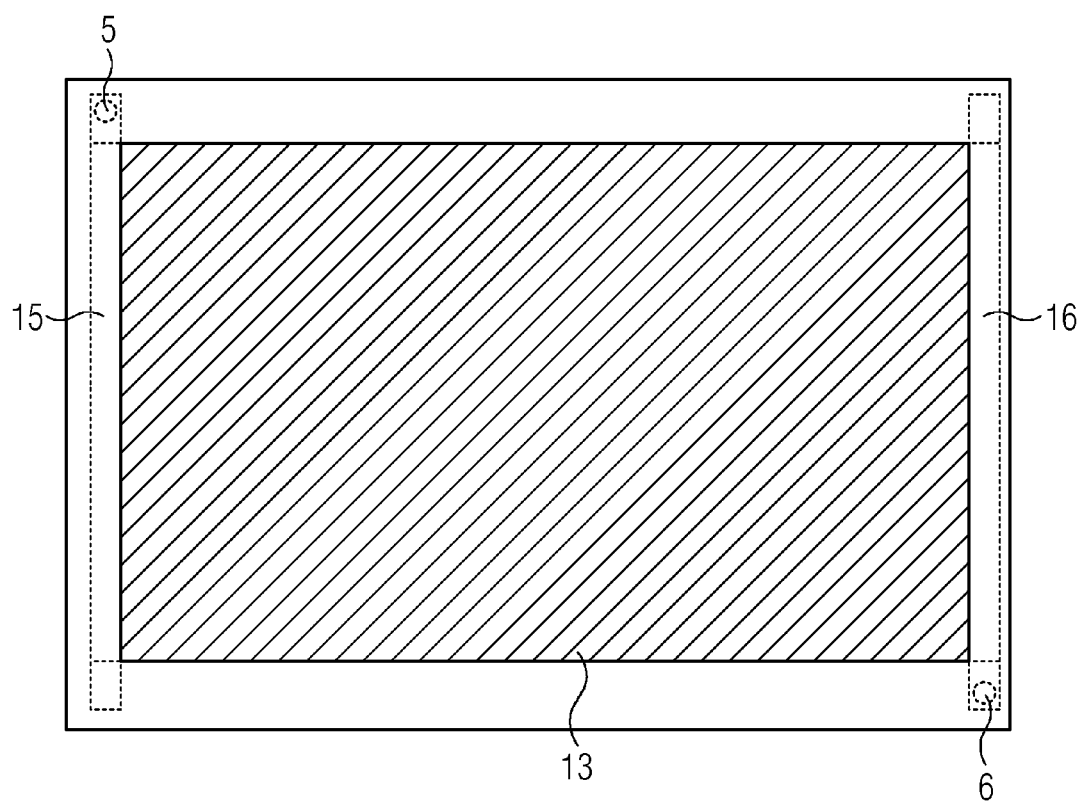
FIG. 5 is a plan view of the laminations 11, 12 and the arrangement 13 thereof.

FIG. 5 shows a view of the laminated core 13 of laminations 11 and 12 shown in FIG. 4, having a fluid inflow 15 and a fluid outflow 16 in the form of a broad channel with bores for the connections 5, 6 in the bipolar plate 3. By means of the connection 5, water can be fed to a half cell 2 and flow via the fluid inflow 15 to the channels 9 formed by the recesses 14 and, with a positive potential applied to the half cell 2, can be electrolytically converted to oxygen and negatively charged hydrogen ions. The oxygen and the unconverted water is conducted away from the electrolytic cell 1 via the fluid outflow 16 and the outflow connection 6. The positively charged hydrogen flows via a gas diffusion layer 10 of the half cell 2, via the MEA 7 and the gas diffusion layer 10 of a second half cell 2 into channels of the second half cell 2, is converted there with a negative potential applied at the second half cell 2 or the laminated core 13 thereof into molecular hydrogen and is conducted via the channels 9 into the fluid outflow 16 and from there, via the connection 6, out of the second half cell 2. The second half cell 2 can also be perfused with water which is fed, via the connection 5 of the second half cell 2 to the fluid inflow 15 of the second half cell 2, into the channels 9, the channels being formed by recesses 14 in a second laminated core 13.

The laminations of the first and second half cell 2 of the electrolytic cell 1 preferably consist of an electrically conductive metal, in particular a steel, iron, copper or titanium. When provided with an electrical contact, the surfaces of the channels or laminations act as electrode surfaces for the electrolysis. However, other pure metals or metal alloys are also suitable.

The invention claimed is:
1. An electrolytic cell, comprising:
 at least two bipolar plates, at least one fluid inflow, and at least on fluid outflow;
 at least one laminated core disposed between said at least two bipolar plates, said laminated core being formed of a plurality of laminations stacked atop of one another and in mutual contact with one another;
 each said laminated core having at least two laminations formed with a multiplicity of Y-shaped recesses each extending through an entire thickness of the respective said lamination;

said at least two laminations being arranged on top of one another with said Y-shaped recesses of mutually adjacent laminations partially, but not completely, overlapping one another in a regular mutual arrangement and forming continuous channels in a direction of a plane of said laminations in fluidic communication with said fluid inflow and said fluid outflow.

2. The electrolytic cell according to claim 1, wherein at least one of the following is true:
said channels are fluidically connected to said fluid inflow and said fluid outflow;
each of said fluid inflow and said fluid outflow has connections for an inward or outward flow of fluid;
the electrolytic cell has electrical terminals;
the electrolytic cell is formed with at least one membrane electrode assembly.

3. The electrolytic cell according to claim 2, wherein said electrical terminals are formed at said at least two bipolar plates and/or at said laminations.

4. The electrolytic cell according to claim 1, wherein:
at least two first laminations are arranged on top of one another, with said recesses of said at least two first laminations overlapping partially, but not completely, to thereby form continuous first channels in the direction of the plane of said laminations; and
at least two second laminations are arranged on top of one another, with said recesses in said at least two second laminations overlapping partially, but not completely, to thereby form continuous second channels in the direction of the plane of said laminations; and
a membrane electrode assembly disposed between said at least two first laminations and said at least two second laminations, said MEA forming a fluidic contact between said first and second channels.

5. The electrolytic cell according to claim 4, wherein said first channels are fluidically connected to a first fluid inflow and outflow, and said second channels are fluidically connected to a second fluid inflow and outflow.

6. The electrolytic cell according to claim 1, wherein the Y-shapes of said Y-shaped recesses are identical shapes rotated, in each case, through 120 degrees.

7. The electrolytic cell according to claim 1, wherein the recesses are disposed to form a regular pattern.

8. The electrolytic cell according to claim 7, wherein said recesses are formed in a shape of a letter Y and are formed in adjacent mutually contacting laminations so as to overlap only in regions defined by ends of the Y-shape.

9. The electrolytic cell according to claim 8, wherein each end of a Y-shaped recess in one lamination is arranged in overlapping relationship with one end of a Y-shaped recess of a respectively adjacent lamination.

10. The electrolytic cell according to claim 1, wherein said laminations have a thickness in a range from 0.5 mm to 5 mm and said channels have a width in a range from 2 mm to 10 mm.

11. The electrolytic cell according to claim 1, wherein said laminations consist of a metal selected from the group consisting of electrically conductive steel, iron, copper, and titanium.

12. The electrolytic cell according to claim 1, wherein said laminations comprises a metal selected from the group consisting of electrically conductive steel, iron, copper, and titanium.

13. The electrolytic cell according to claim 12, wherein said laminations are in electrical contact with one another via regions of direct physical contact and/or said laminations are in electrical contact with electrical terminals of the electrolytic cell.

14. A method of operating an electrolytic cell, the method comprising the following steps:
providing an electrolytic cell according to claim 1;
feeding a fluid (e.g., water) via the fluid inflow into the channels of the at least two laminations, and conducting the fluid away from the channels of the at least two laminations and out of the electrolytic cell via the fluid outflow.

15. The method according to claim 14, which comprises feeding water into the electrolytic cell.

16. The method according to claim 14, which comprises:
feeding the fluid via a first fluid inflow and causing the fluid to flow into the channels of at least two first laminations and conducting the fluid away from the channels of the at least two first laminations out of the electrolytic cell; and
feeding the fluid via a second fluid inflow and causing the fluid to flow into the channels of at least two second laminations and conducting the fluid away from the channels of the at least two second laminations out of the electrolytic cell;
wherein the at least two first laminations and the at least two second laminations are separated from one another by an MEA.

17. The method according to claim 16, which comprises conducting the fluid away from the at least two first laminations via a first fluid outflow and conducting the fluid away from the at least two second laminations via a second fluid outflow.

18. The method according to claim 16, which comprises:
applying a voltage to the bipolar plates and/or laminations between the at least two first laminations and the at least two second laminations to cause an electrolytic conversion of water to take place;
generating hydrogen in the channels of the at least two first laminations and conducting the hydrogen via the first fluid outflow out of the electrolytic cell; and
generating oxygen in the channels of the at least two second laminations and conducting the oxygen out of the electrolytic cell via the second fluid outflow.

19. The method according to claim 16, which comprises:
applying a voltage to the bipolar plates and/or laminations between the at least two first laminations and the at least two second laminations to cause an electrolytic conversion of water to take place;
generating hydrogen in the channels of the at least two second laminations and conducted the hydrogen away out of the electrolytic cell via the second fluid outflow; and
generating oxygen in the channels of the at least two first laminations and conducting the oxygen away out of the electrolytic cell via the first fluid outflow.

20. A method of manufacturing an electrolytic cell according to claim 1, which comprises providing lamination sheets and forming recesses in the lamination sheets by a process selected from the group consisting of stamping, drilling, milling, etching or forming the recesses with a laser.

* * * * *